United States Patent
Ramachandran

(10) Patent No.: US 6,778,715 B2
(45) Date of Patent: Aug. 17, 2004

(54) OPTICAL FIBER-BASED DEVICE WITH TUNABLE BIREFRINGENCE

(75) Inventor: Siddharth Ramachandran, Hoboken, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 94 days.

(21) Appl. No.: 10/289,092

(22) Filed: Nov. 6, 2002

(65) Prior Publication Data

US 2004/0086213 A1 May 6, 2004

(51) Int. Cl.[7] .............................. G02B 6/02; G02F 1/295
(52) U.S. Cl. ............................ 385/5; 385/11; 385/13; 372/6
(58) Field of Search .......................... 385/5, 11, 13; 372/6

(56) References Cited

U.S. PATENT DOCUMENTS

| | | | |
|---|---|---|---|
| 4,308,045 A | 12/1981 | Miller | |
| 4,372,645 A | 2/1983 | Miller | |
| 4,606,605 A | 8/1986 | Ashkin et al. | |
| 4,793,678 A | 12/1988 | Matsumoto et al. | |
| 4,846,547 A | 7/1989 | Falco et al. | |
| 4,898,441 A | 2/1990 | Shimizu | |
| 4,966,431 A | 10/1990 | Heismann | |
| 5,212,743 A | 5/1993 | Heismann | |
| 5,561,726 A | 10/1996 | Yao | |
| 5,822,487 A | 10/1998 | Evans et al. | |
| 5,920,666 A | 7/1999 | Digonnet et al. | |
| 5,930,414 A | 7/1999 | Fishman et al. | |
| 6,175,668 B1 | 1/2001 | Borrelli et al. | |
| 6,188,809 B1 | 2/2001 | Bismuth et al. | |
| 6,211,957 B1 | 4/2001 | Erdogan et al. | |
| 6,233,371 B1 | 5/2001 | Kim et al. | |
| 6,282,341 B1 * | 8/2001 | Digonnet et al. | 385/37 |

* cited by examiner

*Primary Examiner*—Akm Enayet Ullah
*Assistant Examiner*—Jerry T Rahll

(57) ABSTRACT

An optical fiber-based device exhibiting tunable birefringence utilizes a section of fiber including an optically nonlinear core region (i.e., doped with a material such as vanadium or erbium), where the fiber is configured to exhibit circular asymmetry and thus introduce birefringence into the fiber. The circular asymmetry may be accomplished by depositing the nonlinear core material in an asymmetric pattern or by launching the pump signal into an asymmetric mode of the fiber waveguide (i.e., an LP[1,m] mode). Polarization control can be generated by such a device through controlling the intensity of an input optical pump signal, since the pump signal intensity has been found to control the birefringence of a circularly asymmetric fiber waveguide.

16 Claims, 6 Drawing Sheets

OPTICAL FIBER-BASED DEVICE WITH TUNABLE BIREFRINGENCE

TECHNICAL FIELD

The present invention relates to an optical fiber-based device and, more particularly, to a fiber-based polarization controller utilizing optical non-linearity-induced tunable birefringence to provide polarization control.

BACKGROUND OF THE INVENTION

Optical signals propagating in standard, non-polarization preserving optical fiber-based communication systems experience random changes in polarization state from one end of the fiber to the other, as a result of fiber birefringence induced by, among other factors, temperature fluctuations and physical stresses on the fiber. Random polarization changes are evidenced at the output end as polarization dependent loss (PDL) and in some instances polarization mode dispersion (PMD). In-line photonic components typically possess some inherent level of polarization-based loss. As a result, a varying state of polarization (SOP) at the input of such a device will cause random intensity fluctuations in the signal passing through the in-line device. Coherent communications systems rely on interference of the transmitted signal with a local oscillator, and maximum extinction ratios of such interference is guaranteed only when the polarization states of the two signals are identical. A signal with a randomly varying SOP will therefore cause random fluctuations in received power.

The distortions due to PMD may be alleviated by the use of an optical PMD compensator, such as disclosed in U.S. Pat. No. 5,930,414 issued to D. A. Fishman et al. on Jul. 27, 1999. A critical device for enabling a PMD compensator is a polarization controller, which is defined as a device that can alter the SOP of a lightwave signal at the input of a polarization controller to any arbitrary SOP at the output of the polarization controller. Such a polarization controller can also be used to provide for a fixed SOP of a signal entering another device exhibiting polarization dependent loss, or to provide a fixed SOP input signal at an interferometer in coherent communications systems.

Polarization controllers for fiber optic applications have been designed or demonstrated with materials whose birefringence, Γ, can be altered by either the electro-optic response of a material such as lithium niobate ($LiNbO_3$), or thermo-optic and elasto-optic response of amorphous materials such as silica fibers. Polarization controllers using the electro-optic effect may be realized in planar waveguides of $LiNbO_3$. Such planar waveguide polarization controllers have been found to exhibit sufficient speed of operation (e.g., response time on the order of microseconds), but involve complex fabrication steps that make the device expensive to manufacture. In addition, planar waveguide devices have been found to be susceptible to polarization dependent loss and exhibit high insertion losses.

Thermal and mechanical stresses in silica fibers have also been used to fabricate a variety of different polarization controllers where it has been found that uniaxial stress applied on nominally circular silica fibers leads to birefringence (since a fiber under uniaxial stress has dissimilar propagation constants for the two orthogonal polarizations of propagating lightwave signals). Changing the amount of stress on the fiber changes Γ, and a cascade of these elements oriented at different angles can form a polarization controller that is capable of transforming any input SOP to any arbitrary output SOP. Variations of this device have included fiber squeezers that allow rotation of squeezed fiber (thus allowing simultaneous changes in the angle of orientation and birefringence). Alternatively, fiber-based polarization controllers can be formed by rotating or heating cascaded segments of inherently birefringent fibers. All of these fiber-based polarization controllers have the inherent advantages of being compatible with any conventional fiber optic communication system (thus providing an in-line, low loss polarization controller). However, thermal or mechanical control is slow by nature, and the response time of such devices is typically higher than 100 microseconds. In addition, stress-induced polarization controllers are susceptible to breakage and fatigue, thus posing reliability constraints.

Thus, a need remains in the art for a polarization controller that combines the fast, reliable response achievable in electro-optic waveguide devices with the low-loss, cost-effective and fiber-compatible characteristics of existing fiber-based polarization controllers.

SUMMARY OF THE INVENTION

The need remaining in the art is addressed by the present invention, which relates to an optical fiber-based device and, more particularly, to a fiber-based polarization controller utilizing induced circular asymmetry in an optical fiber to provide polarization control.

In accordance with the present invention, a section of optical fiber is formed to exhibit spatial asymmetry in terms of its nonlinear optical response to form a device with a variable birefringence. If either the composition of the optical fiber or the intensity pattern of an applied optical pump signal is not circularly symmetric in the fiber, the fiber will become birefringent. In operation, a pump beam control signal is applied as an input to the section of optical fiber, along with an input signal of unknown (or uncontrolled) polarization. The intensity of the pump beam is used to control the magnitude of the birefringence of the asymmetric fiber and thus the state of polarization (SOP) of the signal passing therethrough. Several such devices can then be cascaded to provide arbitrary control SOP transformations.

In one embodiment of the present invention a fiber may be fabricated to incorporate a dopant (such as erbium or vanadium) that is deposited in a non-circularly symmetric manner and exhibits a doping profile that induces optical non-linearity. In an alternative embodiment, asymmetry can be generated by launching a pump beam into a spatially asymmetric mode, such as one of the LP[1,m] modes. The simultaneous introduction of an optical signal into the conventional LP[0,1] mode and the pump into the asymmetric LP[1,m] mode can be accomplished using standard wavelength division multiplexing (WDM) elements and long-period fiber gratings (LPGs).

Other and further embodiments and uses of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
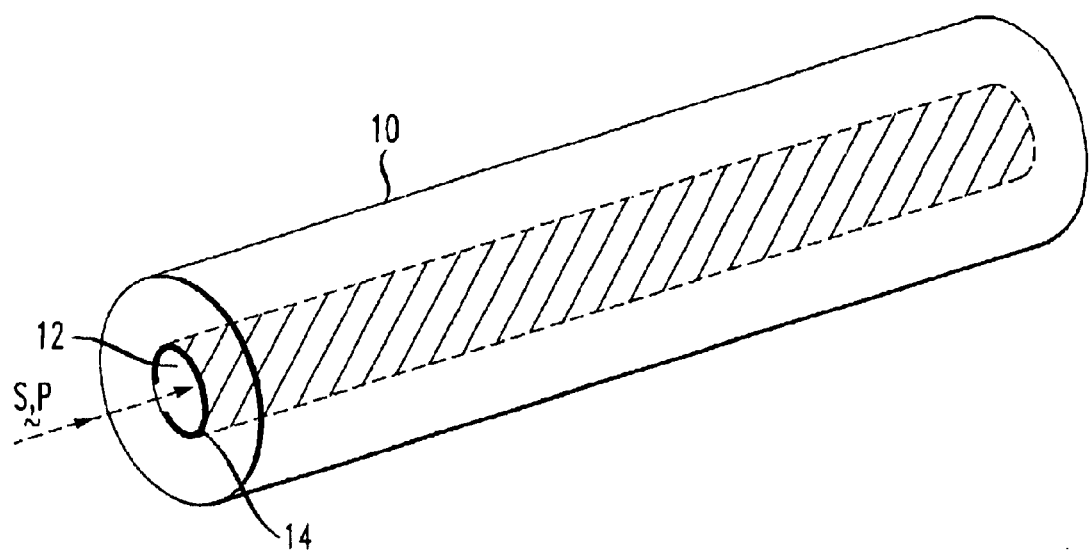
FIG. 1 illustrates an exemplary section of optical fiber including a core region of a nonlinear optical material deposited in an asymmetric pattern along the length of the fiber.

The fundamental building block for a polarization controller is a birefringent element, through which a lightwave signal accrues dissimilar amounts of phase delay for its orthogonal polarization components. The electric field vector of a lightwave signal may be represented by a Jones vector in the following form:

$$E \sim \begin{bmatrix} \cos(\alpha) \\ \sin(\alpha) \cdot e^{i\phi} \end{bmatrix}$$

where $\alpha$ is the angle of one of the orthogonal electric field vectors with respect to a reference axial coordinate system, and $\phi$ represents the phase retardation between the two orthogonally polarized electric field vectors. A birefringent element's effect on a lightwave signal can be represented by a Jones matrix, which transforms the Jones vector of the electric field vector. In the Jones matrix representation, a birefringent element is given by:

$$W = \begin{bmatrix} \cos(\alpha) & -\sin(\alpha) \\ \sin(\alpha) & \cos(\alpha) \end{bmatrix} \cdot \begin{bmatrix} e^{i\Gamma \cdot L/2} & 0 \\ 0 & -e^{i\Gamma \cdot L/2} \end{bmatrix} \cdot \begin{bmatrix} \cos(\alpha) & \sin(\alpha) \\ -\sin(\alpha) & \cos(\alpha) \end{bmatrix}$$

where $\Gamma L$ is the relative phase difference between the two orthogonal polarizations that is caused by the birefringent element. From the above equations, it is apparent that the Jones vector of an electric field vector can take any value in the complex plane if the Jones matrix of the birefringent element is allowed to take arbitrary values of $\alpha$ and $\Gamma$. The birefringence parameter $\Gamma$ is related to the refractive index $\Delta n$ by the following relation:

$$\Gamma = \frac{2\pi}{\lambda} \Delta n$$

where $\lambda$ is the wavelength of the propagating optical signal and $\Delta n$ is the effective refractive index difference between light in two orthogonal states of polarization (SOP). Thus, a polarization controller is realized by cascading several birefringent elements that can allow changes in $\alpha$, $\Gamma$ or some combination of the two.

In accordance with the teachings of the present invention, a polarization controller is formed that comprises a fiber whose nonlinear optical response is spatially non-circular, thus generating a variable birefringence. Nonlinear optical media are well-known in the art and are defined as material whose refractive index varies with the intensity of an optical signal passing therethrough. In a fiber that exhibits optical nonlinearities, the effective refractive index of the lightwave signal can be changed by another pump beam. In this case, if either the material or the optical intensity pattern is circularly asymmetric in the fiber, the fiber will become birefringent.

A polarization controller of the present invention utilizes a fiber whose nonlinear optical response is spatially non-circular. A pump beam, which may be of any wavelength (including that of the lightwave signal), interacts with the nonlinear medium in the fiber to transform a fiber waveguide that is nominally circularly symmetric into a fiber waveguide that is circularly asymmetric. As a result, a lightwave signal propagates through a fiber with a birefringence $\Gamma$, where the magnitude of the birefringence is controlled by the intensity of the pump beam. Since a fiber whose birefringence can be varied in a controlled manner is the basic building block of a polarization controller, several such devices may be cascaded to provide arbitrary control over state-of-polarization (SOP) transformations, allowing for such a device to provide for endless polarization control.

In accordance with the teachings of the present invention, there are at least two different mechanisms that may be used to achieve a circularly asymmetric nonlinear response in an optical fiber. First, a fiber may be fabricated such that its refractive index profile is circularly symmetric, but the doping profile of a dopant that introduces the optical nonlinearity may be deposited in a circularly asymmetric manner. Such asymmetric doping profiles can be achieved using several methods well-known in the art. For example, the dopant may be introduced using solution doping, a technique used in the art to dope optical fiber performs with, for example, erbium. In this process, the glass which forms the core of the fiber is soaked in a liquid containing dissolved erbium salt while the core glass is still porous. To dope particular regions of the glass (thus introduce the desired asymmetry), the solution can be easily made to soak only particular regions of the porous glass. This can be achieved, for example, by partially or completely sintering the particular regions of the core material in which doping should be minimized or avoided.

FIG. 1 illustrates an exemplary section of optical fiber 10 which has been subjected to solution doping to achieve an asymmetric doping profile in accordance with the teachings of the present invention. As shown, fiber 10 contains a core region 12, where core region 12 has been subjected to solution doping during the fabrication process to include predetermined regions 14 comprising erbium (or any other suitable dopant that exhibits a nonlinear optical response, such as vanadium). In this example, a signal light beam S and a pump beam P are both coupled into fiber 10 in the circularly symmetric, fundamental mode (designated as the LP[0,1] mode). Pump beam P interacts with the non-uniformly disposed dopant 14 to yield a perturbation to the refractive index profile of fiber 10 so as to create the desired asymmetric nonlinear response, resulting in creating a birefringence along the length of fiber 10 that may be controlled by controlling the intensity of pump beam P.

Figure 2:
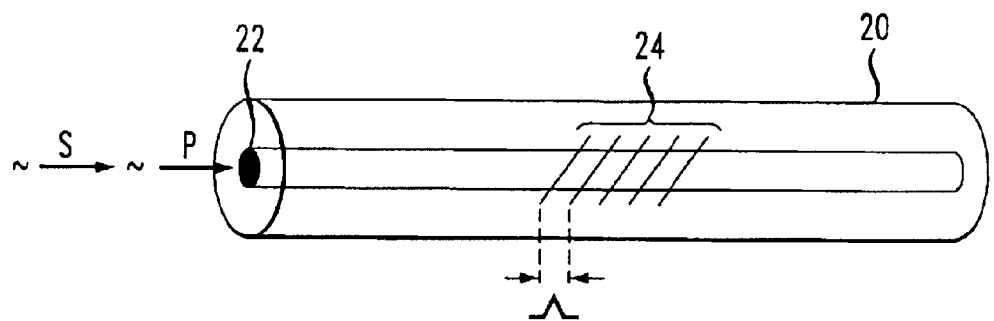
FIG. 2 illustrates an alternative embodiment of the present invention, utilizing a nonlinear optical fiber and a long-period grating to couple an applied optical pump signal into an asymmetric propagating mode along the length of the nonlinear fiber.

Alternatively, pump beam-controllable birefringence in an optical fiber may be achieved, in accordance with the present invention, by fabricating a fiber whose refractive index (as well as nonlinear dopant profile) is circularly symmetric (i.e., a "conventional" fiber), but the pump light is introduced into the fiber in a spatially asymmetric mode, such as one of the LP[1,m] modes. Since the intensity profile of the LP[1,m] modes is circularly asymmetric, the perturbation to the refractive index of the fiber waveguide will also be circularly asymmetric. Therefore, the simultaneous introduction of a lightwave signal S in the conventional LP[0,1] mode and the pump signal P into the LP[1,m] mode will result in creating a system where by controlling the intensity of pump beam B, the birefringence seen by lightwave signal S will also be controlled. FIG. 2 illustrates an exemplary fiber 20 that may be used to introduce lightwave signal S into the conventional mode while also propagating pump beam signal P in one of the LP[1,m] modes. Initially, both signals S and P are introduced into core region 22 of fiber 20 in the LP[0,1] mode (using, for example, a conventional WDM element, not shown). A long period grating 24, exhibiting an appropriate grating period A is utilized to mode-couple only the pump wavelength P into the LP[1,m] mode. As will be discussed below, long period gratings may be realized with periodic microbends, that can be induced by mechanical perturbations, electrical arcs, $CO_2$ laser deformations, acoustic-optics or tilted UV-induced gratings.

Figure 3:
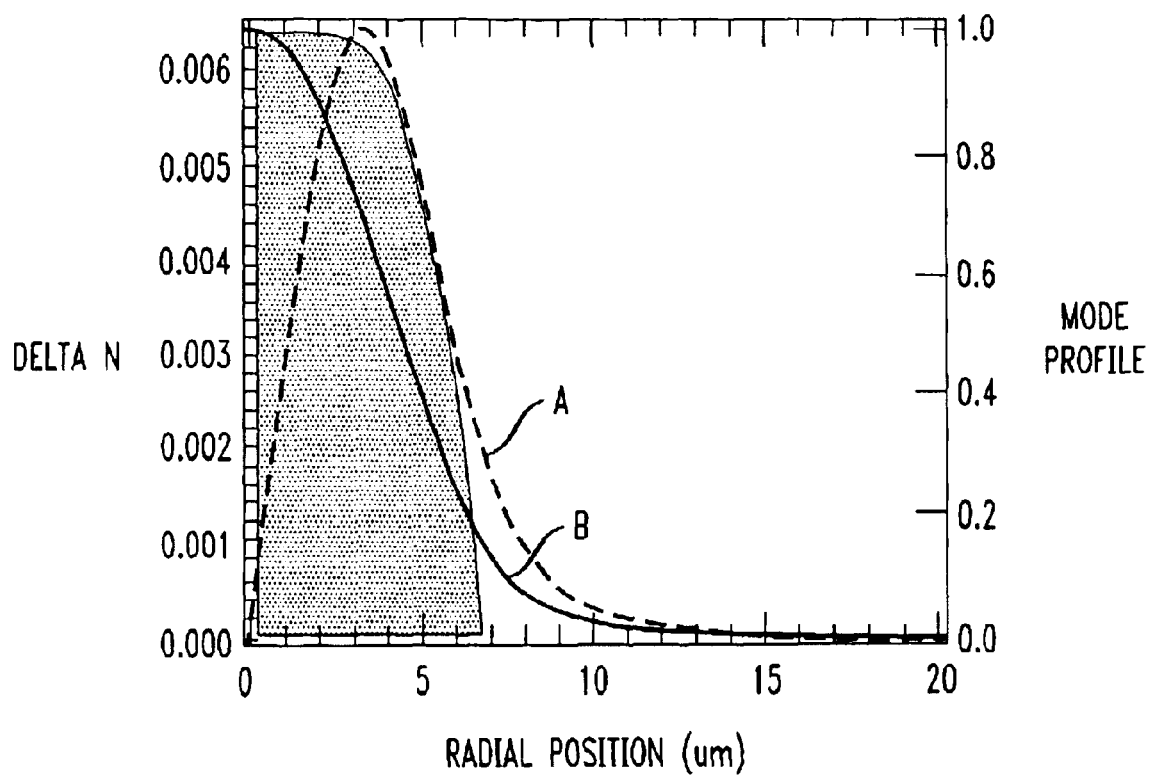
FIG. 3 contains a graph illustrating both a dopant profile and simulated electric mode field profile of signal in the circularly symmetric LP[0,1] mode and the pump in the circularly asymmetric LP[1,m] mode.
Figure 4:
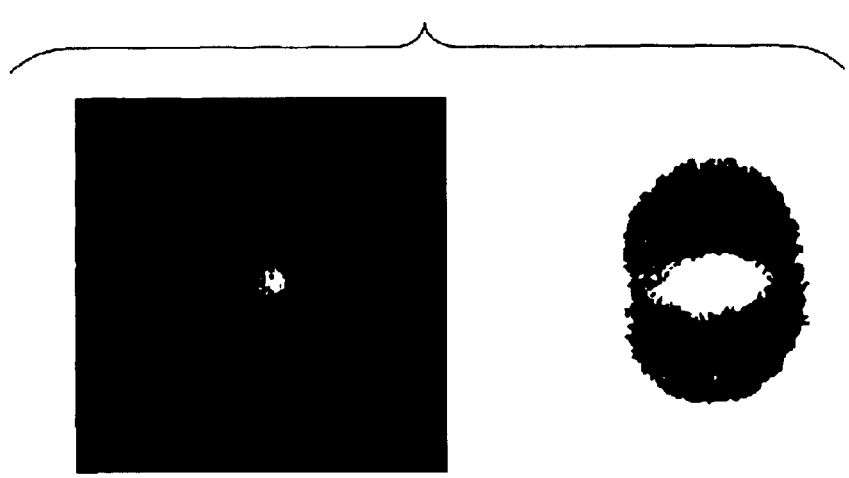
FIG. 4 contains photographs of the mode fields associated with the index profiles of FIG. 3.

FIG. 3 contains a plot of the index profile of a fiber doped with a nonlinear element, such as vanadium, where it is to be understood that a variety of nonlinear dopants may be used, depending on the choice of the intensity and wavelength of the pump, as well as the desired response time for the device and the desired length of fiber used as a birefringent element. As shown, the doping profile is circularly symmetric, such as would be associated with fiber 20 of FIG. 2, with the dopant extending outward from the center of the core region (such as core region 22) to the interface with the cladding layer (such as cladding layer 24). In the graph shown in FIG. 3, the dopant is seen to extend outward approximately 7 $\mu$m from the center of the core. FIG. 3 also illustrates the simulated electric mode-field profiles for the LP[0,1] mode of lightwave signal S at 1550 nm (Curve A) and the LP[1,1] mode of pump signal S at 1060 nm (Curve B). FIG. 4 illustrates actual mode field images associated with these mode-field profiles. As shown, the LP[0,1] mode has a circularly symmetric profile, while the LP[1,1] mode is non-circular. Therefore, the presence of pump signal P in the LP[1,1] mode interacts with the vanadium (or other appropriate) doping in the fiber through a resonant nonlinearity to yield a higher refractive index in proportion to the product of the mode intensity and the doping concentration level. For example, pump powers of 50 mW at 1060 nm have been found to induce effective refractive index changes, $\Delta n \sim 10^{-6}$, in a fiber doped with 16 parts per million vanadium. Larger values of $\Delta n$ may be achieved by increasing the pump power, using higher dopant concentrations, or by using dopants with stronger oscillator strengths.

Figure 5:
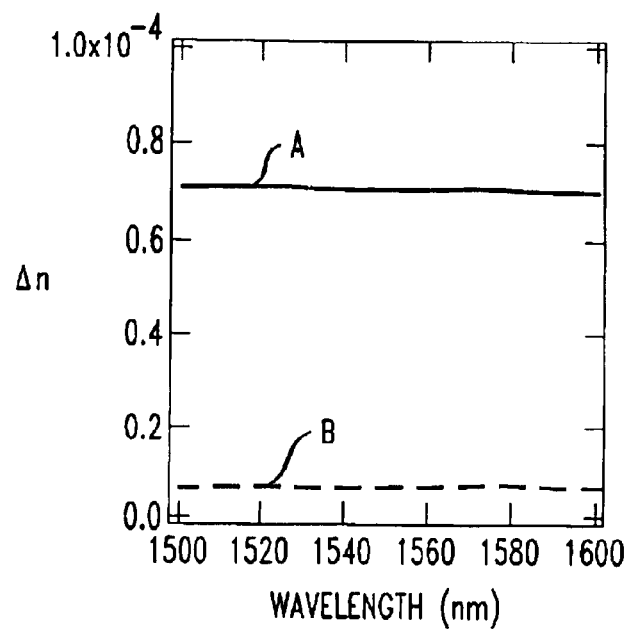
FIG. 5 contains a pair of plots of the difference in effective index in the LP[0,1] polarization mode for two different optical fibers.

The birefringence induced by 1060 nm pump in the LP[1,1] mode can be deduced by simulating the propagation properties of a fiber perturbed by a pump-induced nonlinear index change. FIG. 5 illustrates the results of this simulation in terms of a plot of the difference in the effective indices for the two LP[0,1] polarization modes $\Delta n$, with respect to wavelength. Curve A shows the $\Delta n$ induced for an index perturbation of $10^{-4}$, corresponding to a change induced by 50 $\mu$W of 980 nm pump light in a fiber with one weight percent of erbium. Curve B shows the $\Delta n$ induced for an index perturbation of $10^{-5}$, corresponding to a change induced by 250 mW of 1060 nm pump light in a fiber with 16 ppm of vanadium.

A quantitative metric of the level of birefringence in a fiber is the phase difference between the two polarization modes of the propagating signal S. For a birefringent fiber of length L, the phase difference is given by:

$$\Delta \Phi = \Gamma \cdot L,$$

where $\Gamma$ is the fiber birefringence as defined above. Another metric for characterizing a birefringent fiber is its coupling length, which is defined as the length over which the accumulated phase difference, $\Delta \Phi = \pi$, and is given by:

$$L_C = \frac{\pi}{\Gamma}.$$

Figure 6:
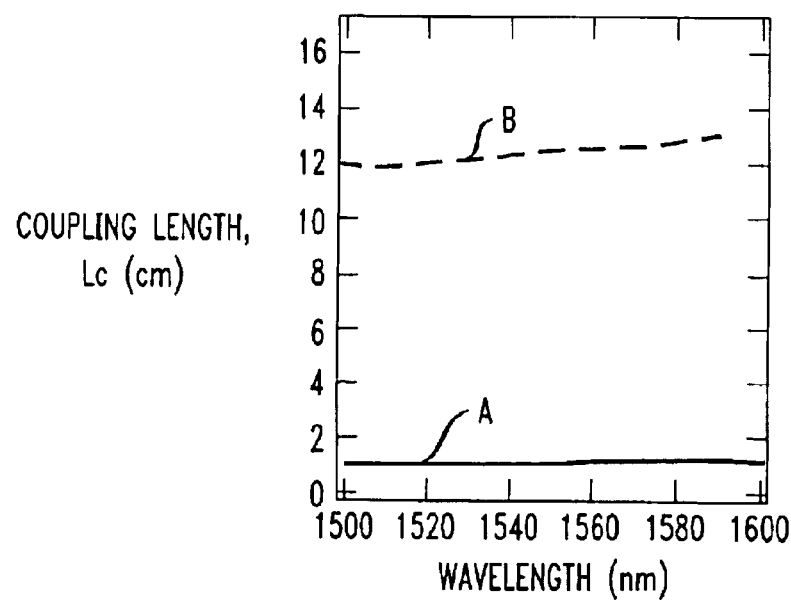
FIG. 6 contains a graph illustrating the variation in coupling length for the two birefringent fibers of FIG. 5.

FIG. 6 contains a graph illustrating the variation of coupling length $L_C$, for the two birefringent fibers discussed above in association with FIG. 5. Curve A shows the value of $L_C$ for an index perturbation of $10^{-4}$, and curve B shows the value of $L_C$ for an index perturbation of $10^{-5}$.

Based on the above information, therefore, it becomes apparent that the birefringence and efficiency of a polarization controlling device formed in accordance with the present invention can be adjusted by: (1) choice of the nonlinear dopant and its concentration levels, thereby changing the level of index perturbations that can be achieved; (2) adjusting the length of the nonlinear fiber, thereby facilitating phase changes of several multiples of $\pi$, and (3) novel fiber design, where the effective index of the LP[0,1] mode is made highly sensitive to small refractive index perturbations (thus reducing pump power requirements for large phase changes).

Figure 7:
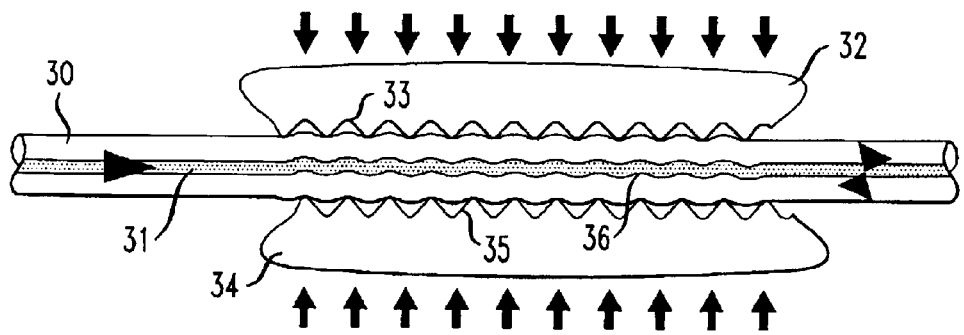
FIG. 7 illustrates an exemplary section of nonlinear optical fiber with external grooved blocks, used to induce microbends along a predetermined length of the fiber so as to couple a pump signal out of the functional mode and into an asymmetric mode.

As mentioned above, a polarization controller formed in accordance with the present invention can be implemented by introducing the pump signal P into the LP[1,m] mode of a nonlinear-doped fiber. This can be achieved by utilizing periodic microbends, which offer strong mode conversion. FIG. 7 illustrates an exemplary microbend-grating induced mode conversion device formed by pressing a fiber 30 (comprising a core region 31 filled with a nonlinear optical material such as erbium or vanadium) with a pair of diametrically disposed blocks 32 and 34. Blocks 32 and 34 are formed to comprise a plurality of grooves 33 and 35, respectively, with periodic microbends 36 formed in fiber 30 as a result of the application of pressure from blocks 32 and 34. The spatially asymmetric perturbations induced on fiber 30 as a result of microbends 36 thus generates a non-zero mode-overlap between a symmetric mode, such as the LP[0,1] mode, and an circularly asymmetric mode such as LP[1,m]. Indeed, strong mode coupling is achieved at a resonant wavelength defined by:

$$\lambda_{res} = \Lambda \cdot (n[0,1] - n[1,m])$$

where $\lambda_{res}$ is the resonant wavelength, $\Lambda$ is the period of grooves 33, 35, n[0,1] is the effective index of the LP[0,1] mode, and n[1,m] is the effective index of the LP[1,m] mode. In addition, the strength of this coupling can be adjusted by changing the pressure applied by grooved blocks 32, 34 on fiber 30.

Figure 8:
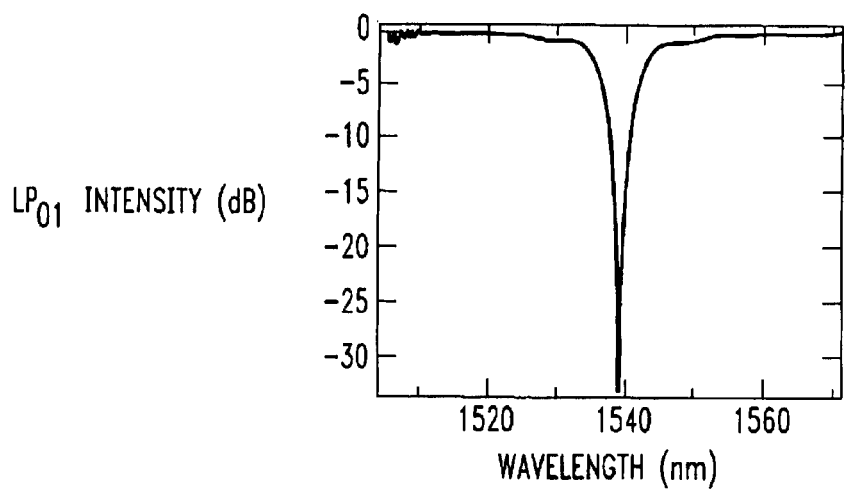
FIG. 8 is a graph of the optical spectra of the LP[0,1] mode as a function of wavelength for the arrangement of FIG. 7.
Figure 9A:
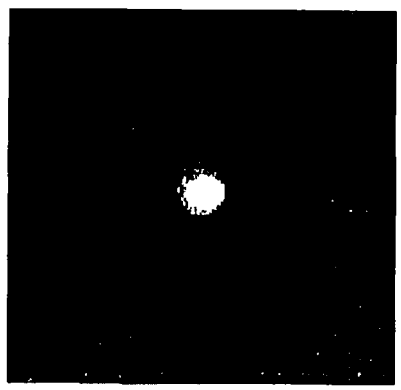
FIG. 9 contains photographs of the near-field image of a pump signal at the input of a mode conversion device (FIG. 9(a)) and the output of a mode conversion device (FIG. 9(b))
Figure 9B:
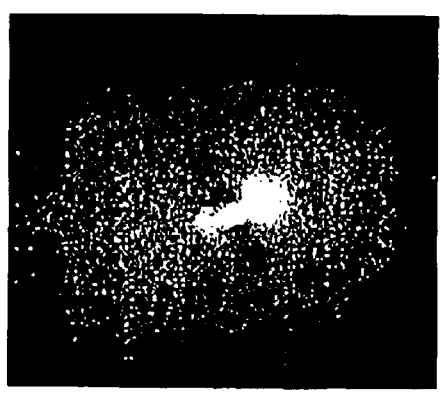

FIG. 8 contains a graph illustrating the use of a long fiber grating such as the arrangement of FIG. 7 to remove an exemplary signal from the conventional circular mode (i.e., LP[0,1]) and insert the signal into an asymmetric mode (such as an LP[1,m] mode). In particular, FIG. 8 is a graph illustrating the spectra of the LP[0,1] mode as a function of wavelength. As shown, a grating can be formed to be a spectrally selective device, and may be designed to convert an incoming LP[0,1] mode into an LP[1,m] at only a desired (e.g., pump) wavelength (in this example, 1538 nm). The use of such a mode-selective grating will ensure that the lightwave signal S will remain in the LP[0,1] after it passes through the grating (such as microbends 36 in fiber 30 of FIG. 7). FIG. 9 shows the actual near-field images of the mode profile of an exemplary pump signal P propagating through a fiber such as fiber 30 of FIG. 7, with FIG. 9(a) illustrating the pump signal mode profile at the input of fiber 30 and FIG. 9(b) illustrating the pump signal mode profile at the output of fiber 30. As is evident from FIG. 9, microbend gratings facilitate mode conversion from a circularly symmetric mode LP[0,1] profile at the input (FIG. 9(a)) of fiber 30 to a circularly asymmetric mode profile LP[1,m] at the output (FIG. 9(b)) of fiber 30, where this conversion is necessary for providing a polarization controller in accordance with the present invention.

Figure 10:
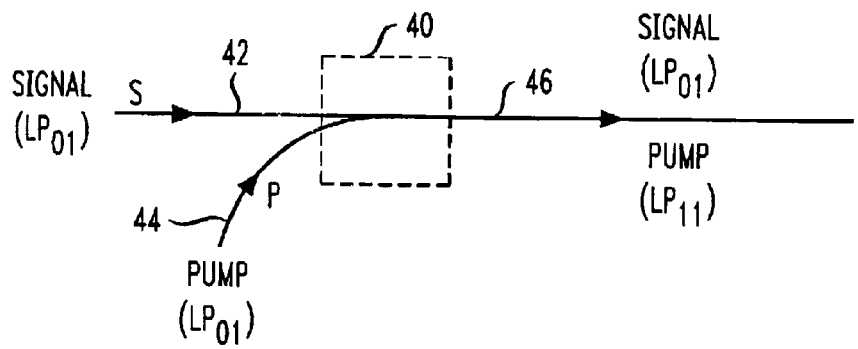
FIG. 10 illustrates an exemplary fused fiber coupler arrangement for providing pump signal mode conversion.

FIG. 10 illustrates an alternative arrangement that may be used to provide mode conversion of an exemplary pump signal from the circularly symmetric LP[0,1] mode to an asymmetric LP[1,m] mode. In particular, FIG. 10 illustrates a fused fiber coupler 40, with input signal S applied along a first single mode input fiber 42, and a conventional pump signal P (propagating at conventional LP[0,1] mode) propagating along a second input single mode fiber 44. In accordance with the operation of fused fiber coupler 40, coupler 40 is configured to phase match the LP[0,1] mode of second input signal mode fiber 44 with the LP[1,1] mode of dual mode/nonlinear output fiber 46, where fiber 46 may then be used as the tunable birefringent fiber of the present invention. In this manner, WDM/fused fiber coupler 40, which functions to combine pump signal P and information signal S, also functions as a mode-converter for the pump beam. This mode conversion technique can also be made to be spectrally selective, as are the long period gratings (LPGs) described hereinabove.

Figure 11:
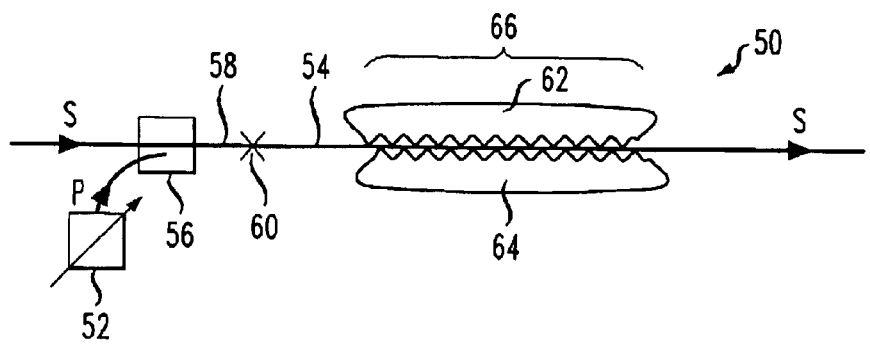
FIG. 11 contains a simplified block diagram of an exemplary polarization controller formed in accordance with the present invention.

FIG. 11 contains a simplified block diagram of an exemplary polarization controller 50 formed in accordance with the present invention. A pump laser source 52 is used, whose wavelength is determined by the absorption lines of the nonlinear dopant used in fiber 54 (e.g., erbium, vanadium, etc.). A wavelength division multiplexer 56 is used to couple both an incoming lightwave signal S and pump signal P into a section of conventional (single mode) fiber 58, which is then coupled to nonlinear fiber 54 at location 60. Various coupling techniques, such as a splice or a wavelength division multiplexer with a long period grating, may be used to make such a connection. For the purposes of the present discussion, the use of a splice will be presumed, although any other suitable coupling technique is permissible. Referring back to FIG. 11, splice location 60 serves to launch both the signal S and pump P into the LP[0,1] mode of nonlinear fiber 54. It is to be understood that nonlinear fiber 54 may comprise any form suitable for providing the required circular asymmetry as discussed above. For example, the nonlinear dopant within fiber 54 may be disposed in an asymmetric pattern, generating the desired asymmetry. Alternatively, the nonlinear dopant may be disposed symmetrically within fiber 54, and an external long period grating structure used to couple the pump signal out of the circular mode and into an asymmetric LP[1,m] mode. In the particular arrangement as illustrated in FIG. 11, a pair of grooved blocks 62, 64 are used to form a microbend region 66 along fiber 54, thus introducing the perturbations necessary to couple pump signal P into an LP[1,m] mode. As discussed above, the birefringence along fiber 54 can be controlled by controlling the intensity I of pump signal P (as indicated by the arrows in FIG. 11).

Figure 12:
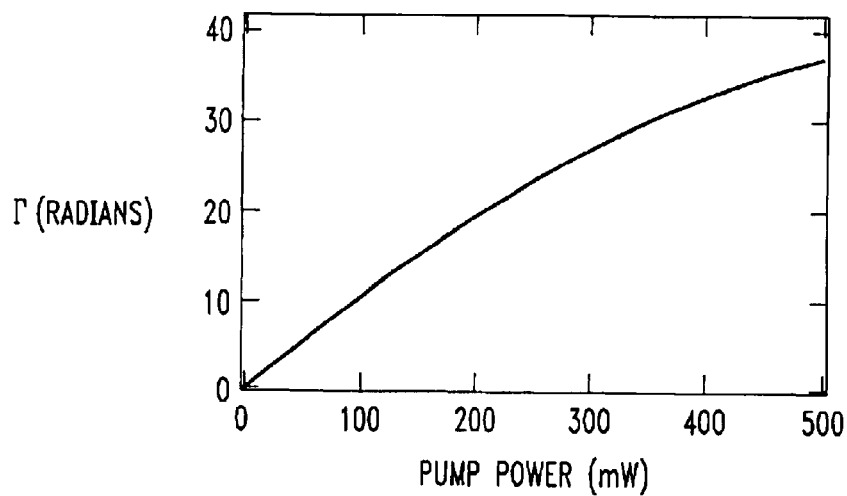
FIG. 12 is a graph illustrating the relationship between the pump signal intensity and the nonlinear fiber birefringence.

FIG. 12 illustrates birefringence (in radians) as a function of pump power (as measured in mW), where the particular results illustrated in FIG. 12 are associated with an asymmetric fiber of the present invention that contains 16 ppm vanadium in the core region of the fiber. As shown, the birefringence exhibits an ever-increasing value as the pump power is increased, reaching a value of approximately 35 radians for a pump power of 500 mW. Thus, the pump power can be used to directly control the amount of birefringence exhibited by the exemplary fiber of the present invention.

Figure 13:
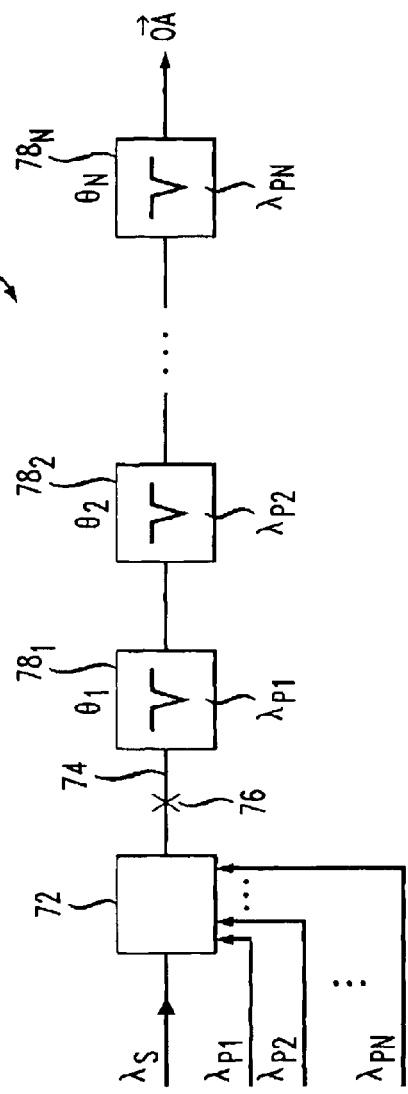
FIG. 13 contains a diagram of an exemplary polarization controller of the present invention that is capable of providing "endless" polarization control using a plurality of pump sources.

FIG. 13 illustrates an exemplary embodiment of the present invention that may be used to provide "endless" polarization control by using a plurality of different pump signals $P_1$–$P_N$, each operating at a different wavelength, illustrated by wavelengths $\lambda_{P1}$–$\lambda_{PN}$ in FIG. 13. As shown, the N pump lasers are multiplexed with the signal wavelength $\lambda_S$ using a 1×(N+1) WDM 72. The various pump wavelengths are chosen to correspond with the absorption bands of the nonlinear dopant disposed within fiber 74. The output from WDM 72 is connected to nonlinear fiber 74 with a splice 76 in the same manner as discussed above in association with FIG. 11. Included along nonlinear fiber 74 is a plurality of mode conversion devices $78_1$–$78_N$ (such as, for example, the mode conversion devices discussed above in association with FIGS. 2, 7 and 11). As shown, each mode conversion device $78_i$ is individually configured to couple a pump signal at an associated wavelength $\lambda_{Pi}$ from the conventional (symmetric) LP[0,1] mode to an asymmetric LP[1,m] mode. In one embodiment, each long period grating within each mode conversion device can be oriented at an angle $\theta_i$ with respect to the optical axis (denoted OA) of the optical communication system. Such an arrangement allows for inducing a circularly asymmetric perturbation at a variety of angles α (see the above equation). The birefringence Γ experienced by the lightwave signal S is thus controlled by individually varying the intensity of each one of the N separate pump signals. As discussed above, control of α and Γ enables any arbitrary state of polarization (SOP) transformation, where such a device thus functions in a like manner as a variable waveplate with full rotational freedom, similar in operation to a rotatable fiber squeezer.

Figure 14:
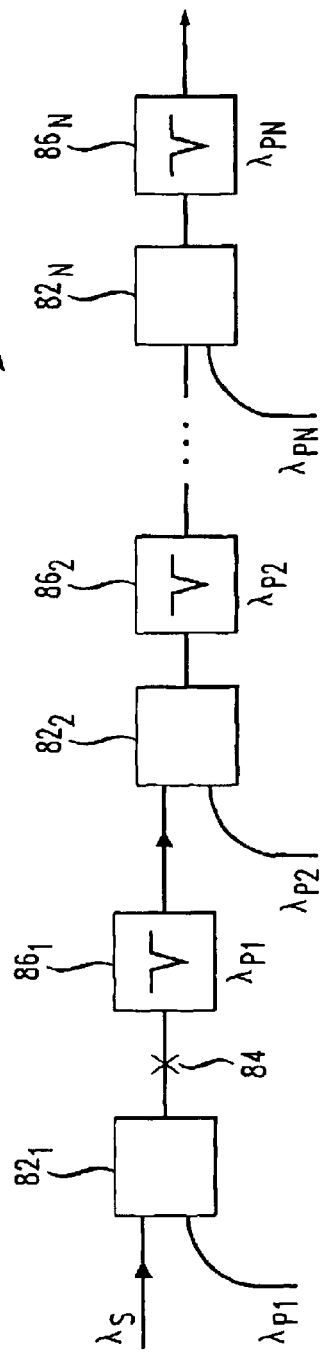
FIG. 14 illustrates an alternative embodiment of the present invention capable of providing "endless" polarization control using a distributed arrangement of pump sources.

FIG. 14 illustrates an alternative embodiment of an "endless" variation polarization controller, which exhibits a distributed architecture in contrast to the arrangement of FIG. 13. Referring to FIG. 14, polarization controller 80 includes a first WDM 82, that is used to couple input signal S (at wavelength $\lambda_S$) and a first pump signal (at wavelength $\lambda_{P1}$) through a first splice location and into a first mode conversion device $86_1$. Using one of the mode conversion techniques described above, the pump signal at $\lambda_{P1}$ is thereafter coupled into the asymmetric LP[1,m] mode and both the asymmetric pump and lightwave signal then propagate through a section of nonlinear fiber $88_1$. As above, the intensity of the first pump signal is controlled to control the birefringence within nonlinear fiber $88_1$. In a similar manner, a second WDM 822 is then used to couple a second pump signal (operating at a different wavelength $\lambda_{P2}$) with the propagating lightwave signal into a second mode conversion device (configured to mode-convert the pump signal at wavelength $\lambda_{P2}$), and so on, for as many pump wavelengths as are used in the system.

As mentioned above, there are a variety of applications that can benefit from an all-fiber polarization controller as implemented in accordance with the present invention. For example, a first-order polarization mode dispersion (PMD) compensator utilizes a highly birefringent fiber to counteract the phase delay accumulated by a lightwave signal during transmission. A polarization controller is a necessary component in such a compensator, as the highly birefringent fiber can provide PMD compensation only of the signal SOP at the input matches with the eigenmodes of the highly birefringent fiber. Thus, a polarization controller is needed to transform the signal SOP into one that corresponds to the eigenmodes of the highly birefringent fiber. Since the signal SOP fluctuates with time, a polarization controller requires a feedback signal that monitors either the received signal quality (such as a bit error rate measurement) to modify the intensity of the pump signal within the polarization controller.

Several communication systems, such as coherent communication systems and systems using differential phase shift keying (DPSK) signaling formats, receive a signal that is interfered with a local oscillator to recover the information from the received signal. For high discrimination in such arrangements, the SOP of the two interfering arms must be essentially identical. Hence, a fast polarization controller that tracks SOP changes to yield identical SOPs for two interfering arms is important to the viability of such communications systems.

Most fiber optic components exhibit some degree of polarization dependent loss (PDL). Therefore, a randomly varying SOP in an input signal will result in an output signal with random intensity fluctuations. This problem can be alleviated by disposing a polarization controller at the input of the PDL device so as to generate a device with a fixed output SOP for any (randomly varying) input SOP.

A polarization controller as implemented in accordance with the present invention may be also be coupled to a polarizer or other such PDL-inducing element. In this case, the intensity of the light passing through the system will be a function of the degree of overlap between the SOP vector at the output of the polarization controller and the poar4lization vector orientation permitted by the polarizer. Therefore, by changing the output SOP of the polarization controller, the intensity of light passing through the polarizer can be controlled.

Various and other uses of a polarization controller formed in accordance with the present invention, as well as other arrangements or embodiments for generating circularly asymmetric pump signal propagation in a nonlinear optical medium, will be apparent to those skilled in the art and are considered to fall within the spirit and scope of the present invention as defined by the claims appended hereto.

What is claimed is:

1. An optical fiber-based device exhibiting tunable birefringence comprising
   a section of optical fiber including a core region of nonlinear optical material;
   a pump source for applying at least one optical pump signal as a control signal input to said section of optical fiber, the intensity of said at least one optical pump signal being variable; and
   means for imparting a circular asymmetry to the nonlinear region said optical material to create an optical birefringence that is varied as a function of the intensity of said at least one optical pump signal.

2. An optical fiber-based device as defined in claim 1 wherein the nonlinear optical material comprises erbium.

3. An optical fiber-based device as defined in claim 1 wherein the nonlinear optical material comprises vanadium.

4. An optical fiber-based device as defined by claim 1 wherein the imparting means comprises an asymmetric disposition of the nonlinear optical material along a predetermined length of the core region of said section of optical fiber.

5. An optical fiber-based device as defined by claim 1 wherein the imparting means comprises a mode conversion device for coupling the at least one pump signal from a circularly symmetric mode to a circularly asymmetric mode.

6. An optical fiber-based device as defined by claim 5 wherein the mode conversion device couples the at least one pump signal from the LP[0,1] mode to an LP[1,m] mode.

7. An optical fiber-based device as defined by claim 5 wherein the mode conversion device comprises a long period grating exhibiting a grating period $\Lambda$ associated with the pump signal wavelength.

8. An optical fiber-based device as defined in claim 7 wherein the long period grating comprises a section of microbends formed along a predetermined length of the nonlinear fiber.

9. An optical fiber-based device as defined in claim 8 wherein the microbends comprise mechanical perturbations introduced along the nonlinear fiber.

10. An optical fiber-based device as defined in claim 8 wherein the microbends comprise tilted UV-induced gratings.

11. An optical fiber-based device as defined in claim 8 wherein the microbends comprise electrical arc-induced perturbations.

12. An optical fiber-based device as defined in claim 8 wherein the microbends comprise $CO_2$ laser-induced deformations.

13. An optical fiber-based device as defined in claim 8 wherein the microbends comprise acousto-optic induced perturbations.

14. An in-line optical polarization controller comprising
    a section of optical fiber including a core region of nonlinear optical material;
    a pump source for applying at least one optical pump signal as a control signal input to said section of optical fiber, the intensity of said at least one optical pump signal being variable; and
    a polarization control arrangement associated with said section of optical fiber for imparting a circular asymmetry to the nonlinear region of said optical material to create an optical birefringence that is varied as a function of the intensity of said at least one optical pump signal to control the state of polarization of a lightwave signal passing through said section of optical fiber.

15. An in-line optical polarization controller as defined in claim 14 wherein the polarization control arrangement comprises an asymmetric disposition of the nonlinear optical material along a predetermined length of the core region of said section of optical fiber.

16. An in-line optical polarization controller as defined in claim 14 wherein the polarization control arrangement comprises a mode conversion device for coupling the at least one pump signal from a circularly symmetric mode to a circularly asymmetric mode.

* * * * *